US010355471B2

(12) United States Patent
Niehoff

(10) Patent No.: US 10,355,471 B2
(45) Date of Patent: Jul. 16, 2019

(54) SEMI VOLTAGE DEPENDENT CIRCUIT BREAKER WITH EARTH FAULT AND OVERCURRENT PROTECTION

(71) Applicant: EATON INDUSTRIES (NETHERLANDS) B.V., Hengelo (NL)

(72) Inventor: Ronaldus Niehoff, Oldenzaal (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 430 days.

(21) Appl. No.: 15/101,423

(22) PCT Filed: Dec. 4, 2014

(86) PCT No.: PCT/EP2014/076597
§ 371 (c)(1),
(2) Date: Jun. 3, 2016

(87) PCT Pub. No.: WO2015/082629
PCT Pub. Date: Jun. 11, 2015

(65) Prior Publication Data
US 2016/0301204 A1    Oct. 13, 2016

(30) Foreign Application Priority Data

Dec. 4, 2013  (GB) .................................. 1321399.6

(51) Int. Cl.
*H02H 3/24* (2006.01)
*H02H 1/06* (2006.01)

(52) U.S. Cl.
CPC ................ *H02H 3/24* (2013.01); *H02H 1/06* (2013.01)

(58) Field of Classification Search
CPC .......... H01H 33/596; H02H 1/04; H02H 1/06; H02H 11/006; H02H 3/06; H02H 3/087;
(Continued)

(56) References Cited

U.S. PATENT DOCUMENTS 4,331,996 A     5/1982  Matsko et al.
6,643,112 B1 * 11/2003  Carton .................... H01H 9/54
                                                                  218/3
(Continued)

FOREIGN PATENT DOCUMENTS

CN      201402962 Y      2/2010
CN      201402965 Y      2/2010
(Continued)

*Primary Examiner* — Thienvu V Tran
*Assistant Examiner* — Nicolas Bellido
(74) *Attorney, Agent, or Firm* — Leydig, Voit & Mayer, Ltd.

(57) ABSTRACT

An alternating current circuit breaker has a processing unit arranged to control a first and second galvanic separation switch, a bypass switch and a semiconductor switch element. A power supply unit is provided which is connected to the live supply connecting terminal and to the neutral supply connecting terminal, and connected to the processing unit and further components of the alternating current circuit breaker for providing electrical operating power thereto. The power supply unit comprises a power reserve unit arranged to supply operating power to the power supply unit for at least a minimum time period after a voltage of the mains supply drops below the minimum operating voltage.

16 Claims, 2 Drawing Sheets

(58) Field of Classification Search
CPC ........ H02H 3/093; H02H 3/207; H02H 1/063;
H02H 3/33; H02H 3/24; H02H 3/247;
H02H 3/34; H02H 7/16; H02H 7/222;
H02H 9/002; H02H 9/005
USPC .................................. 361/2–13, 42, 92, 93.4
See application file for complete search history.

(56) References Cited

U.S. PATENT DOCUMENTS

| | | | | |
|---|---|---|---|---|
| 7,262,945 | B2* | 8/2007 | Galang | H02H 3/207 |
| | | | | 361/90 |
| 8,446,699 | B2* | 5/2013 | Jackson | H02H 3/33 |
| | | | | 361/42 |
| 9,947,496 | B2* | 4/2018 | Niehoff | H01H 9/542 |
| 2007/0247773 | A1 | 10/2007 | Bartonek et al. | |
| 2010/0123991 | A1 | 5/2010 | Reid et al. | |
| 2011/0063759 | A1* | 3/2011 | Billingsley | H01H 9/541 |
| | | | | 361/1 |
| 2012/0050934 | A1 | 3/2012 | Goetz et al. | |
| 2012/0098347 | A1 | 4/2012 | Beierschmitt et al. | |
| 2012/0249151 | A1* | 10/2012 | Dobusch | H01H 83/144 |
| | | | | 324/424 |
| 2016/0301200 | A1* | 10/2016 | Niehoff | H02H 3/021 |
| 2016/0314928 | A1* | 10/2016 | Niehoff | H01H 83/04 |

FOREIGN PATENT DOCUMENTS

| | | | | |
|---|---|---|---|---|
| CN | 101752148 A | 6/2010 | | |
| CN | 101777752 A | 7/2010 | | |
| EP | 1986302 A1 | 10/2008 | | |
| EP | 2320535 A1 * | 5/2011 | ......... | H01H 71/1081 |
| GB | 2288293 A | 10/1995 | | |
| WO | WO 2006060830 A1 | 6/2006 | | |
| WO | WO 2008132058 A1 | 11/2008 | | |
| WO | WO 2011018113 A1 | 2/2011 | | |
| WO | WO 2012040750 A1 | 4/2012 | | |

* cited by examiner

SEMI VOLTAGE DEPENDENT CIRCUIT BREAKER WITH EARTH FAULT AND OVERCURRENT PROTECTION

CROSS-REFERENCE TO RELATED APPLICATIONS

This application is a U.S. national stage application under 35 U.S.C. § 371 of International Application No. PCT/EP2014/076597, filed on Dec. 4, 2014, and claims benefit to British Patent Application No. GB 1 321 399.6, filed on Dec. 4, 2013. The International Application was published in English on Jun. 11, 2015, as WO 2015/082629 A1 under PCT Article 21(2).

FIELD

The present invention relates to an alternating current circuit breaker.

BACKGROUND

International patent publication WO2012/040750 discloses a residual current operated device, comprising an first tripping circuit which is independent of the system voltage, and a second tripping circuit which is dependent on the system voltage.

International patent publication WO2006/060830 discloses a master breaker device having a mains voltage dependent residual current triggering. The device comprises an electronic storage and/or amplifier circuit connected to a summation current transformer and an electromechanical relay or thyristor for controlling a mechanical actuator of a contactor group.

SUMMARY

An aspect of the invention provides an alternating current circuit breaker, comprising: a live line between a live supply connecting terminal and a live load connecting terminal; a neutral line between a neutral supply connecting terminal and a neutral load connecting terminal for connecting an alternating current load to a mains supply; a first galvanic separation switch and a bypass switch in the live line; a second galvanic separation switch in the neutral line; a semiconductor switch element connected parallel to the bypass switch; a processing unit configured to control the first and second galvanic separation switch, the bypass switch, and the semiconductor switch element; and a power supply unit connected to the live supply connecting terminal and to the neutral supply connecting terminal, and connected to the processing unit and further components of the alternating current circuit breaker for providing electrical operating power thereto. The power supply unit has a minimum operating voltage of a predetermined value. The power supply includes a power reserve unit configured to supply operating power to the power supply unit for at least a first time period after a voltage of the mains supply drops below the minimum operating voltage.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
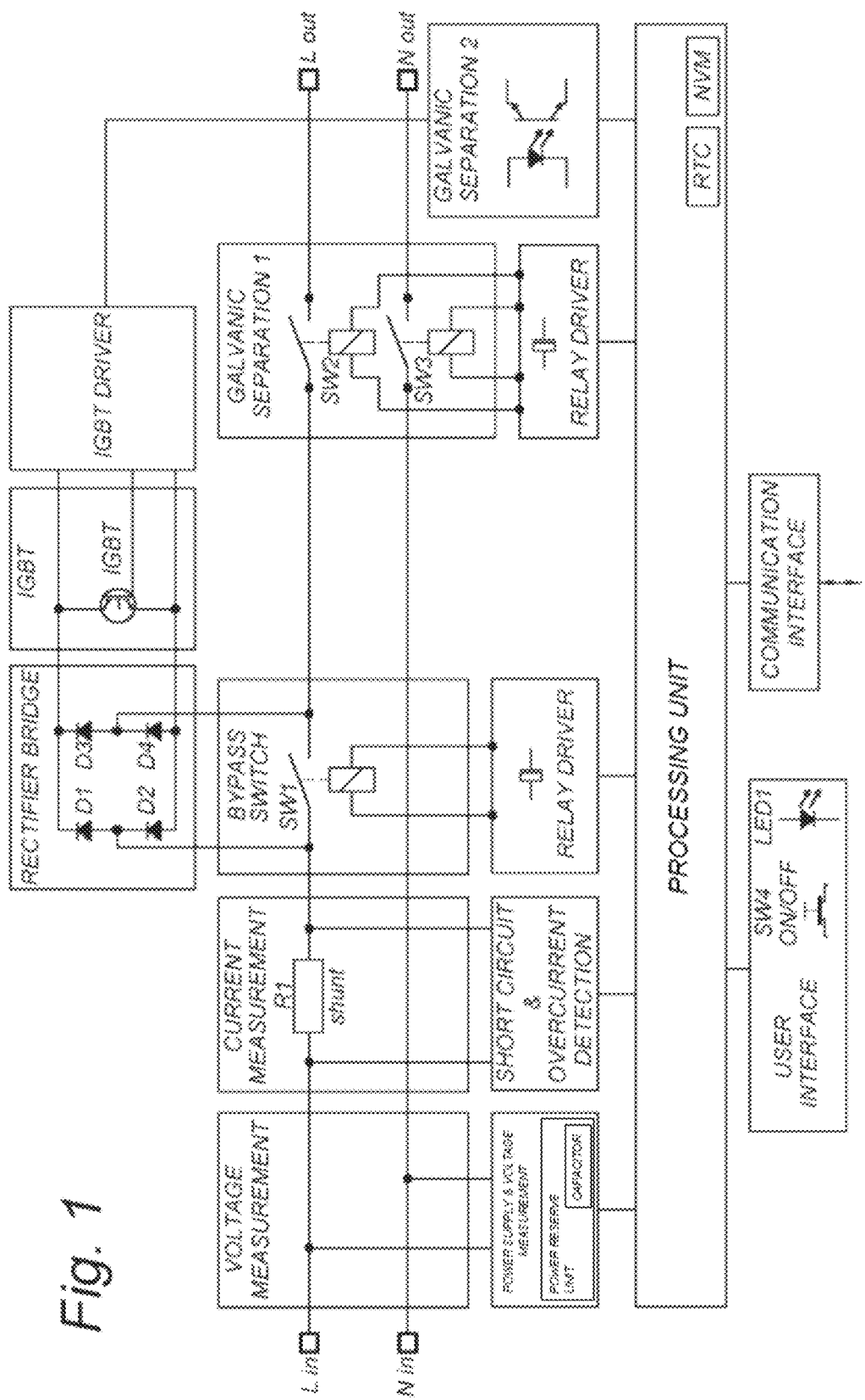
FIG. 1 shows a block diagram of an embodiment of an alternating current circuit breaker according to an embodiment of the present invention.

An aspect of the present invention provides a circuit breaker, of which the earth fault and overcurrent protection remain functional in any case when a load is connected to the circuit breaker, which is an improved version of existing (voltage dependent) circuit breakers.

An aspect of the present invention relates to an alternating current circuit breaker, comprising a live line between a live supply connecting terminal Lin and a live load connecting terminal Lout, and a neutral line between a neutral supply connecting terminal Nin and a neutral load connecting terminal Nout for connecting an alternating current load to a mains supply, a first galvanic separation switch SW2 and a bypass switch SW1 in the live line, and a second galvanic separation switch SW3 in the neutral line, a semiconductor switch element IGBT connected parallel to the bypass switch SW1, and a processing unit arranged to control the first and second galvanic separation switch SW2, SW3, the bypass switch SW1 and the semiconductor switch element IGBT.

According to an aspect of the present invention, an alternating current circuit breaker is provided, comprising a power supply unit connected to the live supply connecting terminal Lin and to the neutral supply connecting terminal Nin, and connected to the processing unit and further components of the alternating current circuit breaker for providing electrical operating power thereto, wherein the power supply unit has a minimum operating voltage of a predetermined value (e.g. 50V) and comprises a power reserve unit arranged to supply operating power to the power supply unit for at least a first (minimum) time period after a voltage of the mains supply drops below the minimum operating voltage. The first, minimum, time period is e.g. 500 ms, allowing sufficient time for the circuit breaker components to remain functional, even when the mains supply voltage drops below a certain voltage level. This enhances safety and robustness of use of such a circuit breaker.

In electrical installations, miniature circuit breakers (MCB) are used as safety devices. In other applications also residual current devices (RCD) are used. The present invention embodiments of an alternating current circuit breaker relate to both of these classes of commercially available devices.

The state of the art is that there are voltage independent (VI) MCB's and RCD's, i.e. these devices are working independently from a supply voltage in the electrical circuit in which these are used. Also, voltage dependent (VD) RCD's are commercially available. There are no common used voltage dependent (VD) MCB's on the market.

According to the definition in the standard for RCD's (Standard for Residual Current Circuit Breakers IEC/EN61008-1 and Standard for Residual Current Circuit Breakers with Overcurrent protection IEC/EN61009-1) an RCD is functionally dependent on the line voltage (VD) "for which the functions of detection, evaluation or interruption depend on the line voltage". It is common practice that VD RCD's are functioning down to e.g. 85V or 50V (50V AC=SELV=Safety Extra Low Voltage). Below this voltage no protection function is available since the electronics is not functional anymore.

For MCB's there is no VD category in the standard IEC/EN60898. It is not allowed to have an overcurrent protection which is voltage dependent. Note that also below 85V or 50V AC there can exist overcurrents which could cause excessive heat or even fire.

Voltage independent MCB's and RCD's have been available for many years. These usually have a simple and inexpensive construction, but there are disadvantages and more important, the functionality is limited and not flexible and not intelligent.

As will be discussed below with reference to the drawings, and as defined in the attached claims, the present invention relates to a new class of alternating current circuit breakers (both MCB and RCD types) which could be classified as semi-voltage-dependent circuit breaker.

In FIG. 1 a block diagram is shown of an embodiment of a circuit breaker according to the present invention. The alternating current circuit breaker comprises a live line between a live supply connecting terminal Lin and a live load connecting terminal Lout, and a neutral line between a neutral supply connecting terminal Nth and a neutral load connecting terminal Nout for connecting an alternating current load to a mains supply AC. The circuit breaker comprises a first galvanic separation switch SW2 and a bypass switch SW1 in the live line, a second galvanic separation switch SW3 in the neutral line, a semiconductor switch element IGBT connected parallel to the bypass switch SW1, and a processing unit arranged to control the first and second galvanic separation switch SW2, SW3, the bypass switch SW1 and the semiconductor switch element. The alternating current circuit breaker further comprises a power supply unit (part of the block Power Supply & Voltage Measurement in FIG. 1) connected to the live supply connecting terminal (Lin) and to the neutral supply connecting terminal (Nin), and connected to the processing unit and further components of the alternating current circuit breaker for providing electrical operating power thereto. The power supply unit has a minimum operating voltage of a predetermined value, e.g. 50V, and comprises a power reserve unit arranged to supply operating power to the power supply unit for at least a first (minimum) time period (T3) after a voltage of the mains supply drops below the minimum operating voltage.

In the embodiment shown in FIG. 1, the semiconductor switch element comprises a combination of a rectifier bridge D1-D4 and an isolated gate bipolar transistor IGBT. Alternating current terminals of the rectifier bridge D1-D4 are connected in parallel to the bypass switch SW1, and direct current terminals of the rectifier bridge D1-D4 are connected to an emitter and a collector terminal of the isolated gate bipolar transistor IGBT. The processing unit is connected to a current measurement unit arranged in the live line, and is arranged to control the bypass switch SW1, first and second galvanic separation switches SW2, SW3 and the conducting state of the isolated gate bipolar transistor IGBT in case of detection of a short circuit condition. The control of opening and closing the bypass switch SW1 and first and second galvanic separation switches SW2, SW3 by the processing unit is implemented using respective relay drivers connected to the processing unit as indicated in the block diagram of FIG. 1.

The rectifier bridge D1-D4 is needed since the IGBT is only conducting in one direction (transistor). It must carry the same current as the IGBT, so also a short circuit. Another solution would be to use to 'anti-parallel' IGBT's with series diodes (to carry the reverse voltage in the OFF state of the IGBT), but this would make the complete circuit more complex and expensive.

With the present state of the technology no other semiconductor solutions are possible. There are FET's with a very low channel-resistance, but these are not available as both high voltage/high current type. Triac's and thyristors cannot be used since they are only able to turn off in the zero crossing and this takes too much time. In case of short circuit they cannot be easily forced to switch off and will blow up finally.

GTO's (gate turn off thyristor) and IGCT (integrated gate-commutated thyristor) need a lot of energy to keep them in the ON state and to turn OFF. Also the driver circuit would be much more complex.

The processing unit is arranged to accommodate the measurement inputs, calculation software and output signal logic and drivers. Most time critical processes can be realized by an EPLD or logic ports, but most of the functionality can be integrated in a µP (microprocessor). Primary functions which are included in the processing unit, and which are explained in more detail below where necessary are:

Mains voltage measurement (via the Power Supply & Voltage Measurement block).

Mains current measurement & calculating overcurrent characteristic (for replacing the bimetal overcurrent protection).

Mains voltage & current synchronization.

Temperature measurement for different components in the MCB (e.g. IGBT and shunt resistor R1).

Driver logic for the relay drivers (including energy monitor of the storage capacitors).

Communication to the IGBT driver unit, user interface and communication interface.

Programming/preset interface for programming (over) current characteristics and a calibration procedure.

Internal storage of data in case of power interruptions (e.g. contact status, mains current history for the overcurrent protection).

The current measurement is done by a shunt. In an embodiment, the current measurement unit comprises a shunt resistor R1 in the life line and a short circuit and an overcurrent detection unit arranged to measure the voltage across the shunt resistor R1. A shunt is the most logic choice for this application since the accuracy and linearity is superior to other components. Also the size is small and price/availability is reasonable. An alternative would be a Rogowski coil which is also accurate over a wide range and in high current applications. The disadvantage is that a Rogowski coil is much bigger and the output signal is much lower which makes an integrated/combined design for short circuit protection and (small) current/energy measurement more difficult. The value of the shunt resistor R1 must be chosen such that at nominal load current there is a low dissipation, e.g. 45 Å/100µΩ ⇒ 0.2 W. The shunt resistor R1 must be capable to withstand the short circuit current for a short time, e.g. 1.5 kA/100µΩ/1.5 ms ⇒ 225 W/0.34 Joule.

The short circuit and overcurrent detection may be implemented using an analog or digital circuit which must be fast enough to detect the short circuit. It also must be accurate enough to sense small load currents for energy measurement purposes. A logical solution is an opamp circuit or integrated (analog ASIC) circuit, but also digital circuits with a high sampling rate are possible.

The alternating current circuit breaker of a further embodiment further comprises an IGBT driver unit connected to the processing unit and a control input of the isolated gate bipolar transistor, wherein the IGBT driver unit is arranged to switch off the isolated gate bipolar transistor in a two-stage process. The IGBT driver unit may further be arranged to monitor the voltage across the IGBT.

The second galvanic separation circuit (Galvanic Separation 2 in the embodiment shown in FIG. 1) comprise one or more optocouplers for communication between the processing and IGBT driver unit. Also a small galvanic separated SMPS may be provided inside the IGBT driver unit to supply the IGBT driver circuit since this driver circuit is on another voltage potential than the other circuit parts of the circuit breaker.

The IGBT driver unit contains the following functions (possibly as separate circuits):

Two step output driver of the IGBT
Voltage (de-saturation) monitor of the IGBT collector-emitter voltage
Bypass switch status monitor
IGBT driver monitor
IGBT ON/OFF input For turning off the IGBT in case of a short circuit disconnection, the IGBT driver unit will decrease the gate voltage of the IGBT in two steps. This action avoids both dangerous overvoltage across the IGBT, and SOA problems, especially at short circuit turn-off. The turn-off delay is about 1 µs; in this time the voltage level of the gate will be about half the normal on-voltage.

The bypass switch status monitor function detects whether the bypass switch SW1 is closed; this is done by checking the voltage across the IGBT. The status information of SW1 is forwarded to the processing unit, and can then be used for the delayed turn-off command for the IGBT in case of a short circuit.

The IGBT driver monitor checks power supply voltage of the driver circuit, this is forwarded to the processing unit. If this voltage is too low the IGBT will be in the off-state and this is a fail situation in normal operation.

The IGBT ON/OFF input receives the ON/OFF command from the processing unit.

In a further embodiment, the alternating current circuit breaker further comprises a user interface connected to the processing unit. The user interface e.g. comprises a test switch SW4 and a status indicator. The user interface is e.g. only a push button or a toggle switch with some LEDs to signal the status of the MCB (Powered/ON/OFF/failure etc.).

Furthermore, the alternating current circuit breaker may comprise a communication interface connected to the processing unit, allowing remote operation and monitoring. The communication interface is used to send all possible data to any medium (e.g. bus-system, internet or RS485), wired or wireless (RF/IR).

Note that the configuration from the diagram shown in FIG. 1 and described herein is a 1 pole+N configuration (only overcurrent and short circuit protection in the phase). If a 2 pole device is needed a second bypass switch, overvoltage protection, rectifier bridge, snubber, IGBT and IGBT driver are included in a further embodiment. Also more complex configurations of the mains supply with multiple poles (e.g. 3 phase, 3 phase+neutral, or even 4 phase) can be accommodated by further embodiments with associated additional components.

From prior art circuit breakers (especially RCD's) it is known that below a certain voltage, voltage dependent (VD) RCD's have no protection function anymore. However these situations of extra low AC mains voltages do seldom occur, will be directly notified and often will be fast restored. Besides of that, if there would be a direct human contact caused by a different isolation failure, for RCD's it is even no dangerous situation since the human body can handle these extra low voltages without any danger. Nevertheless this discussion of 'protection available depending on the line voltage' is for many countries reason not to accept VD RCD's.

By the presently proposed circuit breaker implementation and operating method the disadvantage of the voltage dependent category RCD's and MCB's is eliminated while it is still possible to use the circuit breaker embodiments for smart-grid needed functionalities and technologies.

As shown in the block diagram of FIG. 1 and described above, the power supply unit for the AC circuit breaker electronics is connected to the line side of the circuit breaker (Lin, Nin), which means that also in case of a disconnected load the electronic components of the circuit breaker are still supplied with operating power and are functional.

In case the supply voltage is decreasing to a voltage below e.g. 50V (e.g. because of a mains voltage dip or main-switch which is switched off) all relays SW1 . . . SW3 will be opened under control of the processing unit and the load is disconnected. The 50V is the (predetermined) minimum working voltage of the supply electronics. In other words, the processing unit is arranged to determine an under voltage situation if the supply voltage of the mains supply is lower than the minimum operating voltage (for longer than a predetermined undervoltage time period), and to switch off the alternating current circuit breaker in case of an under voltage situation. Switching off the circuit breaker relates to all relays (of Bypass switch SW1 and galvanic separation relays SW2, SW3) and the IGBT, as discussed above.

The power supply of the electronics does have a power reserve of at least e.g. 500 ms, so this disconnection will only take place after this 500 ms time. In other words, the power reserve unit comprises one or more capacitors having a minimum storage capacity, of which the capacity depends on the circuit breaker electronic components to be controlled at a possible low voltage situation.

The processing unit of the embodiment shown in FIG. 1 further comprises a non-volatile memory (NVM) which can be used to store a variety of data. More specifically, the processing unit further comprises a non-volatile memory to store status data of the alternating current circuit breaker directly before a switch off actuation (independent of which situation occurs, e.g. an undervoltage situation as described above, but also an overcurrent situation, i.e. the regular safety function of the circuit breaker).

The status data of the switch (on/off) before the supply voltage dip is stored in a nonvolatile memory module (NVM) of the processing block. Nonvolatile memory can retain stored information even when not powered. The status data may also be more detailed: the status data may comprise the switch positions of the bypass switch SW1 and the galvanic separation switches SW2, SW3, and the status of the semiconductor switch element (IGBT).

After the mains voltage is restored it takes some time to charge all capacitors again (e.g. 200 ms) and have the full circuit functionality available/restored again. With the status information of the switch in the memory NVM it can be decided to switch on the MCB/RCD again. In other words, the processing unit is further arranged to wait a second predetermined time period after the mains supply is restored before determining whether or not to switch the alternating current circuit breaker on depending on the status stored in the non-volatile memory. The second predetermined time period is equal to the time needed to recharge (capacitors of) the power reserve unit, and is e.g. a maximum of 200 ms. In an advantageous embodiment, the switching on actuation of the circuit breaker is synchronized with the mains supply, e.g. at a zero crossing of the mains supply voltage.

In case of power dips or interruptions shorter than the e.g. 500 ms power reserve time the MCB/RCD does not open, but in case the interruption is lasting longer than the power reserve time the time of the unpowered load is increased only by the e.g. 200 ms power up time.

Figure 2:
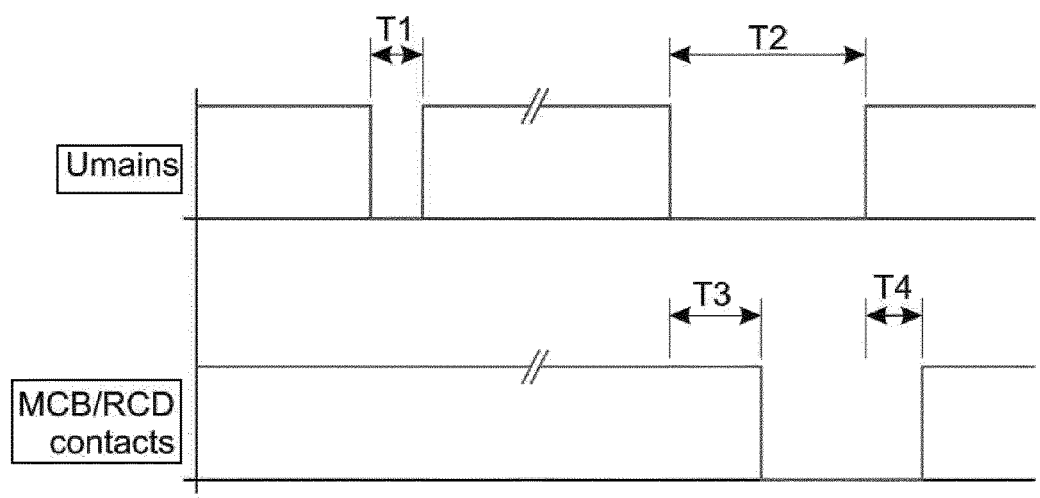
FIG. 2 shows a timing diagram related to operation of the present invention circuit breaker.

The functionality is further explained with reference to the timing diagram of FIG. 2. In case there is a mains interruption with a duration T1 shorter than the power reserve time T3 of the electronics, the MCB/RCD contacts stay closed (circuit breaker on). In case there is a mains interruption with a duration T2 longer than the power reserve time of the electronics the MCB/RCD opens its contacts at the end of the power reserve time T3. The energy for opening of the contacts is stored in the relay driver capacitors. After the mains supply is restored (at the end of duration T2 as indicated in FIG. 2) the MCB/RCD electronics (specifically power reserve unit) will be charged again in period T4; and because the contacts of the circuit breaker were closed before the mains interruption, the contacts will be closed again now. By this functionality of the present invention circuit breaker, there is always the full MCB/RCD protection available, independent on any mains voltage.

Besides of the storage of the status of the switch also the information of the overcurrent situation before the power interruption can be stored. For this, the status data may further comprise a load current value as measured directly prior to the switch off actuation of the alternating current circuit breaker (e.g. using the shunt measurement, possibly multiple measurements to obtain load current as function of time, . . . ).

In case of a voltage dependent MCB the traditional bimetal overcurrent protection is replaced by e.g. a shunt measurement of the load current in combination with an algorithm which determines the trip time of the overcurrent protection. This algorithm is part of the software in the processing unit. To be able to measure time, also when the undervoltage situation is longer than the first time period T3, the processing unit further comprises a real time clock (RTC), as shown in FIG. 1. The real time clock is e.g. used to determine a time period since the switch off actuation of the alternating current circuit breaker.

In this algorithm there is also a time factor, which simulates the heat curve of the traditional bimetal in a further embodiment. This bimetal is however simulating the heat curve of the wiring in the system. It may be clear that a current measurement by e.g. a shunt in combination with a software algorithm is much more accurate and stable over time than a bimetal. Also the overcurrent parameters are flexible and programmable in the processing unit.

Depending on the power interruption time T1, T2 a traditional bimetal also will cool down by nature, and this can be simulated by using the RTC (real time clock) in the processing unit which is still functional in the power down mode. For short interruptions, e.g. <10 seconds, the cooling down will be not significant, but for longer power failures the information of the RTC must be considered. However after a time frame of e.g. 5 to 10 minutes there is no significant heat increase in the wiring remaining so this RTC may have only a limited power reserve time. Modern RTC-chips have possible backup times for even months by using e.g. a super-capacitor.

The proposed circuit also has a traditional toggle on/off switch (SW4) at the front of the breaker, which can be operated manually. In case the on/off toggle at the front is set in the off position during the voltage interruption, it will not automatically reclose after the voltage interruption in a further embodiment. In other words, the processing unit is connected to an on/off toggle switch (SW4), and is further arranged to block actuation of the bypass switch relay (SW1) (and galvanic separation relays SW2, SW3) if the on/off toggle switch (SW4) is in an off position.

The off position of the on/off toggle at the front of the present circuit breaker has always a higher priority than a remote control or internal software on-signal. This also provided similarly in a 'service mode' for the installer. Note that the status of the contacts of the circuit breaker still can be off while the on/off toggle at the front is in the on position (due to internal software or remote control off commands). This however can be displayed at the front by e.g. a colored led. This situation is also possible at conventional MCB's; this is called the 'trip-free' function. It however never can occur that the on/off toggle at the front is in the off position while the load is connected. When the on/off toggle at the front is in the off position there is always a safe galvanic separation of the load.

For all the present invention embodiments, the voltage level for disconnecting the load can be programmed different from the minimum working voltage of the electronics of the circuit breaker. In case of an undervoltage protection function this can by any voltage lower than 85% of the mains voltage combined with a duration. In an analogue manner, an overvoltage protection can be implemented using a threshold value different from a maximum working voltage.

Disconnecting loads at supply voltages lower than 50V (or any too low mains voltage with a certain duration) will also prevent loads from damage due to undervoltages.

The restoring time (second time period T4) after a mains interruption is adjustable/programmable, as is power reserve time (the first time period T3). This makes a more smooth re-powering of the full installation possible; the present invention circuit breaker embodiments add a soft (re)start functionality. Besides the programmable delay it also switches on the load in the zero-crossing of the mains voltage. Nowadays re-powering of installations after a mains interruption is more and more problematic due to capacitive loads. Depending on the type of load also for mains interruptions shorter than the power reserve time T3 this soft restart functionality is sometimes needed or useful; e.g. in case of SMPS or motor drives. This is also programmable within the present invention Smart MCB concept.

The relay driver capacitors (in the relay driver blocks) have the energy for two switching actuations of the relays SW1 . . . SW3 in a further embodiment: the bypass switch SW1 and galvanic separation switches SW2, SW3 are actuated using electrical energy stored in a respective capacitor component, each capacitor component having a capacity which is sufficient for at least two actuations of the associated bypass switch SW1 and galvanic separation switches SW2, SW3. This is necessary in case directly after reclosing the circuit breaker a failure occurs (e.g. an overcurrent). In this case the MCB/RCD must immediately open its contacts again.

The present invention embodiments have been described above with reference to a number of exemplary embodiments as shown in the drawings. Modifications and alternative implementations of some parts or elements are possible, and are included in the scope of protection as defined in the appended claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An alternating current circuit breaker, comprising:
a live line between a live supply connecting terminal and a live load connecting terminal;
a neutral line between a neutral supply connecting terminal and a neutral load connecting terminal for connecting an alternating current load to a mains supply;
a first galvanic separation switch and a bypass switch in the live line;
a second galvanic separation switch in the neutral line;
a semiconductor switch element connected parallel to the bypass switch;
a processing unit configured to control the first and second galvanic separation switches, the bypass switch, and the semiconductor switch element; and
a power supply unit connected to the live supply connecting terminal and to the neutral supply connecting terminal, and connected to at least the processing unit of the alternating current circuit breaker for providing electrical operating power thereto,
wherein the power supply unit has a minimum operating voltage of a predetermined value, and
wherein the power supply unit includes a power reserve unit configured to supply operating power to the power supply unit for at least a first time period after a voltage of the mains supply drops below the minimum operating voltage.

2. The alternating current circuit breaker of claim 1, wherein the power reserve unit includes a capacitor including a minimum storage capacity.

3. The alternating current circuit breaker of claim 1, wherein the processing unit is configured to determine an under voltage situation if the supply voltage of the mains supply is lower than the minimum operating voltage, and to switch off the alternating current circuit breaker in case of an under voltage situation.

4. The alternating current circuit breaker of claim 1, wherein the processing unit further includes a non-volatile memory to store status data of the alternating current circuit breaker directly before a switch off actuation.

5. The alternating current circuit breaker of claim 4, wherein the status data includes switch positions of the bypass switch and the galvanic separation switches, and a status of the semiconductor switch element.

6. The alternating current circuit breaker of claim 4, wherein the status data further includes a load current value as measured directly prior to a switch off actuation of the alternating current circuit breaker.

7. The alternating current circuit breaker of claim 4, wherein the processing unit further includes a real time clock to determine a time period since a switch off actuation of the alternating current circuit breaker.

8. The alternating current circuit breaker of claim 1, wherein the processing unit is further configured to wait a second predetermined time period after the mains supply is restored before determining whether or not to switch the alternating current circuit breaker on depending on a status stored in a non-volatile memory.

9. The alternating current circuit breaker of claim 8, wherein the second predetermined time period is equal to a time needed to recharge the power reserve unit.

10. The alternating current circuit breaker of claim 8, wherein the first and the second predetermined time periods are programmable.

11. The alternating current circuit breaker of claim 1, wherein the bypass switch and galvanic separation switches are actuated using stored electrical energy sufficient for at least two actuations of the associated bypass switch and galvanic separation switches.

12. The alternating current circuit breaker of claim 1, wherein the processing unit is connected to an on/off toggle switch, and
wherein the processing unit is further configured to block actuation of the bypass switch relay if the on/off toggle switch is in an off position.

13. The alternating current circuit breaker of claim 5, wherein the status data further includes a load current value as measured directly prior to a switch off actuation of the alternating current circuit breaker.

14. The alternating current circuit breaker of claim 5, wherein the processing unit further includes a real time clock to determine a time period since a switch off actuation of the alternating current circuit breaker.

15. The alternating current circuit breaker of claim 6, wherein the processing unit further includes a real time clock to determine a time period since the switch off actuation of the alternating current circuit breaker.

16. The alternating current circuit breaker of claim 13, wherein the processing unit further includes a real time clock to determine a time period since the switch off actuation of the alternating current circuit breaker.

* * * * *